United States Patent [19]

von Bonin et al.

[11] Patent Number: 5,543,230

[45] Date of Patent: Aug. 6, 1996

[54] LAMINATED GLASS CONSTRUCTION HAVING AN INTERMEDIATE LAYER OF A FIRE-PROOFING GEL

[75] Inventors: Wulf von Bonin, Odenthal; Ulrich von Gizycki, deceased, late of Leverkusen, by Ursula von Gizycki, heir; Roland Leroux, Elsheim; Thomas M. Karschti, Budenheim; Jürgen Thürk, Schornsheim, all of Germany

[73] Assignees: Bayer Aktiengesellschaft, Leverkusen; Schott Glaswerke, Mainz, both of Germany

[21] Appl. No.: 397,697

[22] Filed: Mar. 1, 1995

Related U.S. Application Data

[60] Division of Ser. No. 932,123, Jul. 31, 1992, Pat. No. 5,425,901, which is a continuation-in-part of Ser. No. 730,360, Jul. 15, 1991, Pat. No. 5,182,049.

[30] Foreign Application Priority Data

Jul. 21, 1990 [DE] Germany ............... 40 23 310.3
Aug. 13, 1991 [DE] Germany ............... 41 26 702.8

[51] Int. Cl.$^6$ ............... B32B 17/06; B27N 9/00; C09K 21/12
[52] U.S. Cl. ............... 428/432; 428/426; 428/428; 428/920; 252/610; 252/611
[58] Field of Search ............... 252/610, 611, 252/315.01, 315.2; 106/18.15; 428/426, 427, 428, 432, 49, 920

[56] References Cited

U.S. PATENT DOCUMENTS

| | | | |
|---|---|---|---|
| 3,945,987 | 3/1976 | Stossel | 252/315.2 |
| 3,974,316 | 8/1976 | Jacquemin et al. | 428/215 |
| 3,997,700 | 12/1976 | Jacquemin et al. | 428/332 |
| 4,190,698 | 2/1980 | De Boel et al. | 428/334 |
| 4,370,442 | 1/1983 | Pearson | 524/598 |
| 4,913,847 | 4/1990 | Tünker | 252/606 |
| 5,182,049 | 1/1993 | von Bonin | 252/378 R |

FOREIGN PATENT DOCUMENTS

| | | |
|---|---|---|
| 306677 | 7/1988 | European Pat. Off. . |
| 468259 | 7/1991 | European Pat. Off. . |

OTHER PUBLICATIONS

Derwent Abstract, J04173891.

Primary Examiner—Philip Tucker
Assistant Examiner—Joseph D. Anthony
Attorney, Agent, or Firm—William C. Gerstenzang; Sprung Horn Kramer & Woods

[57] ABSTRACT

Fireproofing gels based on amine salts of acid phosphates are characterised in that they comprise an aluminium component, a phosphorus component, an amine component and if appropriate water in proportions such that, at 5 to 30° C. for more than 24 hours, they form a mixture which is capable of flow, and on heating to temperatures above 45° C. they change into a transparent gel in less than 24 hours. In addition to other uses, such fireproofing gels are particularly suitable for the production of laminated glass constructions having a-fire protection action.

1 Claim, No Drawings

LAMINATED GLASS CONSTRUCTION HAVING AN INTERMEDIATE LAYER OF A FIRE-PROOFING GEL

This is a division of application Ser. No. 07/923,123 filed on Jul. 31, 1992, now U.S. Pat. No. 5,425,901 which is a CIP application of Ser. No. 07/730,360, now U.S. Pat. No. 5,172,049, filed Jul. 15, 1991.

The present invention relates to fireproofing gels based on amine salts of acid phosphates, their preparation and their use.

BACKGROUND OF THE INVENTION

The use of gels, which usually contain water, as intermediate layers in laminated glass constructions is known. Alkali metal silicate gels or gels based on organic polymers are in general used for this purpose. The former have the disadvantage that, because of the alkali metal content, in the event of a fire they promote melting through or flowing away of the glass at high temperatures, and the latter have the disadvantage that they burn after evaporation of the water and leave behind the glass unprotected.

Intumescence carriers, including those in solid form, which comprises ammonium and/or amine salts of acid phosphates of metals of group 2 and/or 3 of the periodic system of the elements are the subject matter of a previous patent application filed by the Applicant Company. In contrast, fireproofing gels and precursors thereof which are of relatively low viscosity, that is to say capable of flow, at about room temperature and form transparent gels at a higher temperature have now been found.

SUMMARY OF THE INVENTION

Fireproofing gels according to the invention which are based on amine salts of acid phosphates are characterised in that they comprise an aluminium component, a phosphorus component, an amine component and if appropriate water in proportions such that, at 5° to 30° C. for more than 24 hours, they form a mixture which is capable of flow and which changes into a transparent gel within less than 24 hours on heating at temperatures above 45° C.

PREFERRED EMBODIMENT

A preferred aluminium component is aluminium hydroxide, a preferred phosphorus component is ortho-phosphoric acid and preferred amine components are addition products of epoxides on ammonia and primary and/or secondary mono-and/or polyamines, for example ethanolamine.

The process according to the invention for the preparation of fireproofing gels based on amine salts of acid phosphates is characterised in that an acid aluminium phosphate is prepared from an aluminium compound and ortho-phosphoric acid and this is reacted in a 20 to 85% strength by weight aqueous solution with an aminoalcohol, the following proportions being maintained 2 to 4 mol of ortho-phosphoric acid per mol of aluminium compound and 0.5 to 1.5 mol of aminoalcohol per 100 grams of acid aluminium phosphate in 20 to 85% strength by weight aqueous solution.

Preferably, 2.5 to 3 mol of ortho-phosphoric acid are employed per mol of aluminium compound, and 0.9 to 1.3 mol of aminoalcohol per 100 grams of acid aluminium phosphate.

If, for example, a 20% strength by weight aqueous solution of an aluminium tris-phosphate is used as the starting substance, 45 to 65 parts by weight, preferably 50 to 60 parts by weight, of ethanolamine can be employed, for example, per 100 parts by weight of phosphate solid. If, for example, an 80% strength by weight aqueous solution of an aluminium tris-phosphate is used as the starting substance, 30 to 70 parts by weight, preferably 45 to 65 parts by weight, of ethanolamine can be employed, for example, per 100 parts by weight of phosphate solid. The amount of ethanolamine to be employed by way of example and preferably at other concentrations of aluminium tris-phosphate solutions can be determined by linear interpolation between the above-mentioned corner data.

Possible aminoalcohol components for fireproofing gels to be prepared according to the invention are, above all addition products of epoxides, preferably of ethylene oxide and/or propylene oxide, on ammonia and primary and/or secondary, aliphatic, aromatic and/or araliphatic mono- and/or polyamines. Preferred addition products are those on mono- and/or dialkylamines having 1 to 24 C atoms per alkyl radical, preferably addition products of ethylene oxide and/or propylene oxide on methylamine, ethylamine, propylamine, butylamine, oleylamine, aniline and polyalkylene-polyamine, for example polyethylene-polyamine. Ethanolamines, especially mono-ethanolamine, are particularly preferred.

The process according to the invention provides fireproofing gels which are capable of flow at 5° to 30° C. for more than 24 hours and, on heating to temperatures above 45° C., change into a clearly transparent, high-viscosity, gelled form, which is in general no longer capable of flow, in less than 24 hours.

Fireproofing gels according to the invention can be used for purposes of preventive fire protection.

For example, fireproofing gels according to the invention can be employed as intermediate layers in laminated glass constructions having a fire protection action. They are also suitable as soaking agents and/or impregnation for rigid and flexible foams or textile structures, as a filling for sealing devices (for example for sealing hoses and sealing textile tapes), as cable filling and for the production of fireproofing putties, it also being possible in some cases for an intumescence action during exposure to flames to take effect. The fireproofing gels according to the invention can also be used for coating sheet-like structures, for example carpets, wood, card, textiles, plastics, metals and/or masonry, as a filling for hollow spaces, as mortar or a mortar additive, as a component in textile bindings which impart fire protection or as a fire-resistant adhesive composition.

Before the gelling, further substances can be added to the-products according to the invention if appropriate. Examples of possible substances for this purpose are: fillers, for example in the form of powders, flakes, (hollow) beads or granules, which can be, for example, of glasses, graphites, expanded and/or expandable graphites, carbon particles, carbon fibres, mineral fibres, mica, other silicates, titanium dioxide, pearlites, vermiculites, asbestoses, silicic acids, quartzes, alumosilicates and/or borosilicates. Colour donors, light stabilisers, agents which trap free radicals, substances having specific absorption properties to achieve filtering or darkening effects in the electromagnetic spectrum, metal powders, metal fibres or metal flakes, cellulose, starch, sugars, polyols, photochromism-forming agents, nucleating agents (for initiation and evening out of foaming in the event of exposure to flames), biocides and/or odiferous substances are also possible. Such other substances can be present in fireproofing gels according to the invention in total amounts of, for example, 0 to 60% by weight.

For mechanical reinforcement, if appropriate, the gels according to the invention can furthermore contain, for example, non-wovens, networks, grids, wires, fibres and/or fibre strands of the most diverse materials.

Products according to the invention which have not yet gelled completely can also, for example, be (partly) dried and employed in the manner intended in the form of viscous coatings, compositions which can be processed as plastics or unsupported films. Thermoplastic processing processes up to 150° C. or more, for example calendering, injection moulding, extrusion and/or pressing, can be used here.

Fireproofing gels according to the invention are particularly preferably used for the production of intermediate layers in single- or multilayered laminated glass construction, it being possible to follow a procedure in which the fireproofing gel is introduced, in the form which is capable of flow and before gelling, between sheets of glass and is then gelled by heat treatment at above 45° C. A procedure can also be followed in which the fireproofing gel is used before gelling to coat sheets of glass which are joined together, before or after the gelling, which can be combined with an increase in concentration by drying if appropriate, to form a single- or multilayered composite sheet of glass.

Another path for the production of a laminated sheet of glass comprises rendering the reaction products of aluminium phosphate and aminoalcohol largely or completely anhydrous, converting them into film form by thermoplastic processing processes, if appropriate also using carrier films, applying them in this form to the sheets of glass and then joining these together to form a laminated construction.

The glass for production of such laminated glass constructions can be, for example, panes of glass of float glass, window glass, wire-reinforced glass, fire-resistant glass, quartz glass, plastic glass and/or glass ceramic.

Another use of fireproofing gels according to the invention comprises employing them for coating, impregnating, glueing, filling and/or bonding substrates in the building and construction sector.

Laminated glass materials which contain fireproofing gels according to the invention can have, for example, the build-up of glass/gel layer/glass/gel layer/glass, that is to say be a 3-pane laminate. If appropriate, the material can also be a 4-pane laminate. The thickness and the material character of the various glasses and/or gel layers can be varied, for example the thickness can be varied between 0.05 and 25, preferably between 0.1 and 10 mm. The gel character of the intermediate layers according to the invention is already advantageous merely because the laminated glass construction cannot leak out when damaged. Due to their pronounced gel character, the intermediate layers according to the invention are no longer capable of flow.

The intermediate layers according to the invention are no longer capable of flow and have a particularly pronounced gel character in particular if proportions which are within the abovementioned preferred ranges of the amounts of aluminium phosphate and aminoalcohol employed are used.

The water content of the intermediate layer materials according to the invention, which are of course also suitable for other intended uses, can be chosen as desired and can depend on the constructional circumstances of the field of use and the exposure to heat to be expected. For example, 40 to 100% strength by weight, preferably 50 to 85% strength by weight, formulations of the amine salts of acid phosphates to be employed according to the invention can be used.

In addition to aminoalcohols, alkali metals or alkaline earth metals can also be employed in the reaction with aluminium phosphate. Preferably, however, no such additives or only small amounts of such additives, for example less than 10% by weight, based on the amine, are used.

If a laminated glass construction having intermediate layers according to the invention which contain water is exposed to flames, the pane of glass on the flames side cracks. Steam flows out in the region of the cracks and cools the laminated glass construction. At the same time, such cracks are blocked by the solid contained in the intermediate layer material, so that hardly any material is lost. During the course of exposure to flames, the intermediate layer material between the panes of glass becomes cloudy and a layer of intermediate layer material pyrolysate, which reduces passage of radiation, forms on the pane of glass on the flame side. The intermediate layer material furthermore starts to intumesce in the region of the flames and forms a mineralised foam which provides insulation both against passage of heat and against passage of other radiation. The intumescence foam which forms furthermore fills out again, in an insulating manner, any material lost in the region of the intermediate layer, so that a type of self-healing effect occurs. After prolonged exposure to flames, the carbon contained in the decomposition products burns and a white, heat-resistant mineral layer which reflects heat and radiation back into the fire space forms on the flame side.

These processes which proceed on exposure to flames, in their entirety, already lead to very good fire-resistant properties of laminated glasses provided with intermediate layers according to the invention in the case of a two-pane laminate, but particularly so in the case of a three- or four-pane laminate. For example, fire resistance classifications in the region of F 30 in accordance with DIN 4102 can be achieved on window glass three-pane laminates having 3–5 mm intermediate layers. Such laminated panes can be produced, for example, by preparing the precursor of the fireproofing gel according to the invention in a form capable of flow at temperatures below 30° C., if appropriate filtering and/or degassing this, and then pouring it, without bubbles, between the panes of a prefabricated pane of laminated glass and causing the precursor which is capable of flow to gel at, for example 50° to 120° C., preferably 60° to 90° C. Any shrinkage which may occur can be compensated by topping up with gel-forming agents. Finally, the filling opening can be sealed, for example, with a putty composition.

It is also possible to pour the gel-forming agent in a flat layer onto sheets of glass, if appropriate to dry it and, before or after gelling has taken place, to produce the laminate by bringing together panes of glass coated in this way or if appropriate also panes of plastic, for example of polymethyl methacrylate, polyvinyl chloride, polycarbonate, cellulose esters, aromatic polyesters or polyurethane, by layer on layer or glass on layer, it also being possible, if appropriate, for the laminate to be pressed at 0° to 120° C., preferably 15° to 80° C. If panes of plastic are also used, these are advantageously located inside the laminate.

The gel-forming agents, which can be called precursors which are capable of flow, can preferably be prepared by feeding a solution of the aluminium phosphate, which is as clear as possible and has the given concentration, continuously or batchwise into a mixing unit, for example a stirred kettle, a static mixer or a continuously operating mixing head, such as is known from multi-component polyurethane chemistry, and mixing it there with the particular aminoalcohol.

The reaction components are preferably employed at room temperature. On mixing, when the reaction which thereby takes place has ended, a usually clear product solution which is heated by the heat of reaction released is obtained. This is preferably then cooled immediately to temperatures of below 45° C., preferably below 35° C., for which, for example, a period of less than 60 minutes, preferably of less than 20 minutes, is observed. The solutions thus obtained are capable of flow for more than 24 hours at 5° to 30° C. They can be mixed with additional components, if appropriate, and/or stored in this state and then put to use.

For example, such gel-forming agents can also be impregnated into more or less open-celled, for example soft, flexible foams, for example those of viscose or polyurethanes, and then allowed to gel in these by heat treatment. Even after gelling, such foams retain a good flexibility if they were soft foams. They can be used as fire-repellant coverings or for closing joints, hollow spaces or cable ducts in walls against fire. Since the gel-forming agent contained therein or the gel has a high content of largely inorganic material which is capable of intumescence and has a high resistance to fire, a high fire protection resistance of the space closures produced with it is obtained by means of a flexible sealing material of this type with good manageability.

It is likewise possible, for example, to finish textile substrates, for example bindings of cotton woven fabric or glass non-wovens or knitted mineral wool, by impregnating or coating with the gel-forming agents or gels. Such products can be used, for example, for protection of pipelines, cables or construction components against the effect of fire or as a sealing material.

If the gel-forming agents or the gels are anhydrous or largely anhydrous, they can be processed as thermoplastics at temperatures of between, for example, 90° and 170° C., preferably between 110° and 150° C., to give films or mouldings, which can then also be used as laminated glass intermediate layers or for other fireproofing purposes.

The invention is illustrated by way of example below. The parts and percentages stated relate to the weight, unless noted otherwise.

EXAMPLE 1 a) Preparation of a phosphate solution

Commercially available aluminium hydroxide (468 parts) was dispersed in a mixture of desalinated water (247 parts) and 85% strength ortho-phosphoric acid (2075 parts). The dispersion was heated to 130° C. (heating bath temperature), while stirring, until, after 30 minutes, a clear solution had formed. This had a solids content of 80%. If appropriate, it can be diluted to lower concentrations with desalinated water.

b) Preparation of a gel-forming agent 100 parts of a phosphate solution (obtained according to a)) adjusted to 50% strength was mixed intensively with 27.8 parts of ethanolamine in a stirred vessel at 22° C. While heating to 70° C., a clear solution formed. This was cooled to 22° C. in the course of 18 minutes by cooling with water. A clear product solution which flows easily at 22° C. for more than 48 hours and has a pH of 6 was obtained.

c) Preparation of a gel 100 parts of the solution, warmed to 22° C., of the gel-forming agent (obtained according to b)) were introduced, without bubbles, into the intermediate spaces of a prefabricated three-pane laminated glass of window glass. The intermediate spaces to be filled with the gel-forming agent had an inside width of 4.5 mm. The filled laminate glass construction was then heat-treated for 15 hours in a heating cabinet set at 70° C. The laminate was then taken out of the cabinet and cooled slowly. The laminate was clearly transparent and the intermediate layers had gelled, that is to say were no longer capable of flow.

d) Fire testing

The three-pane laminate obtained according to c) was incorporated in a size of 50×50 cm into the test field of a small fire oven which was operated in accordance with DIN 4102 and heated up in accordance with the standard temperature curve (STC). At a starting temperature of 34° C. on the outside surface of the laminate facing away from the flame, a temperature of 160° C. was measured by contactless measurement using an IR temperature-measuring unit after 31 minutes. After 130 minutes, the temperature was 465° C. The pane of glass facing away from the flame did not shatter, the laminate was closed visually and the space closure was preserved. After the laminate construction had been dismantled, it was found that the surface on the flame side had been converted into a white ceramic material.

EXAMPLE 2

100 parts of 20% strength phosphate solution obtained according to Example 1a) were mixed intensively with parts of ethanolamine. The resulting clear solution was cooled to 18° C. It remained readily capable of flow for 40 hours. After the solution had been mixed with 15% of glass flakes and degassed in vacuo, it was introduced into a glass cylinder of 2.5 cm diameter, which was then heat-treated at 80° C. in a circulating air cabinet for 12 hours. During this operation, the material in the cylinder solidified to a gel and no longer flowed out of the cylinder when it was turned upside down.

EXAMPLE 3

100 parts of 80% strength phosphate solution obtained according to Example 1a) were mixed intensively with 43 parts of ethanolamine. The resulting clear solution was cooled to 20° C. It remained capable of flow for 40 hours. A glass cylinder of 2.5 cm diameter was filled with this solution and was then heat-treated at 75° C. in a circulating air cabinet for 12 hours. During this procedure, the material in the cylinder solidified to a gel which no longer flowed.

EXAMPLE 4

100 parts of a 60% strength phosphate solution obtained according to Example 1a) were stirred intensively with 35 parts of ethanolamine. A readily flowing solution which was clear was obtained, and was cooled to 20° C. In this state, the solution remained capable of flow for more than 48 hours, and its pH was 6.

The solution which was capable of flow was used to impregnate a viscose soft foam sheet material having a high flexibility and a weight per unit volume of 100 kg/m$^3$. Material was introduced into the foam until its weight per unit volume rose to 700 kg/m$^3$. The foam was then packed into a tightly fitting polyethylene sheath and heat-treated at 70° C. for 14 hours. The impregnation solution had then solidified to a gel and no longer ran out of the foam material when this was handled and bent. Strips having a cross-section of 3×3 cm were now cut out of the foam which had been impregnated with gel and forced into a test wall having a groove 2 cm wide. After standing at room temperature in a roofed hall for 50 days, the wall groove test specimens were incorporated in a small fire test oven and exposed to flames in accordance with DIN 4102 according to the STC curve. After 120 minutes, the space closure in the groove remained preserved. Neither flames nor fire gases issued from the groove.

EXAMPLE 5

100 parts of 50% strength phosphate solution obtained according to Example 1a) were mixed intensively with 24 parts of diethanolamine. The clear thinly liquid solution was cooled to 20° C. It remained capable of flow in this state for more than 40 hours. On heat treatment (15 hours, 80° C.), it changed into a soft, clear gel which no longer flowed.

EXAMPLE 6

A pane of window glass was coated to a level of 3 mm with the reaction product with ethanolamine which was obtained according to Example 3 and was capable of flow, and was heated-treated to constant weight at 80° C. in a circulating air cabinet. Thereafter, a virtually anhydrous, clear coating which no longer flowed existed on the pane. This pane of glass was then brought together with a second 3 mm thick pane of fire-resistant glass (Duran®) to form a two-pane laminate, so that the coating was present as the intermediate layer.

In the fire testing according to Example 1d, the space closure remained in existence with this construction for 120 minutes, and after 8 minutes the pane construction, the window glass pane of which was positioned on the flame side, had become opaque, so that passage of flame radiation through the pane was impeded.

EXAMPLE 7

4150 parts of 85% strength ortho-phosphoric acid were stirred under reflux with 490 parts of water and 936 parts of aluminium hydroxide for 1 hour. A clear solution of the salt of 3 mol of ortho-phosphoric acid and 1 mol of aluminium hydroxide was formed. The solution flowed readily at room temperature.

5000 parts of the above 80% strength solution were initially introduced into a stainless steel kettle with a cooling device at room temperature. 2400 parts of ethanolamine were added, while stirring thoroughly and cooling at the same time, at a speed such that the reaction temperature could be kept at 80° C. The clear solution formed was then cooled to 35° C. in the course of 15 minutes and finally to room temperature. A clear solution which was readily capable of flow and was also still capable of flow after 50 hours at room temperature was obtained. The 85% strength solution prepared in this way was divided into four equal parts. One part remained undiluted, and in each case one of the other parts of the solution was diluted to 25, 50 and 75%. These four solutions were each introduced into a wide test-tube having a capacity of 75 ml and the tubes were closed with aluminium foil and placed in a heating cabinet, preheated at 80° C. for 12 hours. During this operation, all the solutions changed from the state which was capable of flow to the gel state, which was also stable at 80° C. The more concentrated gels were clearly transparent, and only in the case of the 25% strength solution had a very slightly cloudy gel formed.

EXAMPLE 8

The 75% strength solution obtained as described in Example 7 was poured into the first intermediate layer in a three-pane laminate having dimensions of 50×50 cm and with pane separations of 3.5 mm, and the 50% strength solution was poured into the second intermediate layer. The laminate was then heated at 70° C. for 12 hours, during which the intermediate layers gelled.

In the oven testing according to Example 1d), in which the 50% strength gel was incorporated on the flame side, fire resistance class F 30 (in accordance with DIN 4102) was reached.

EXAMPLE 9

A gauze bandage of 10 m and 10 cm wide, such as is customary for the preparation of gypsum bandages, was passed through an impregnating device charged with the 85% strength phosphate salt solution obtained according to Example 7, and wound into a coil which weighed 300 g. The coil was introduced into a shrink-film tube, the tube was closed over the coil and the packaging was fixed by shrinking in. The impregnation of the coil was then allowed to gel at 80° C.

After storage at room temperature for 4 weeks, the gelled coil was taken out of the packaging. The bandage was unwound from the coil, which took place easily in spite of the gelled impregnation. The gelled impregnated material adhered to the bandage fabric. The unwound bandage was now wound firmly on a length of 25 cm by a 2 cm thick polyvinyl chloride cable of a high-voltage line. This was effected easily, since the gelled material had a certain intrinsic tackiness which ensured good interlayer joining of the wrapping and held the wrapping firmly on the cable.

The cable was now left for 3 months under internal room conditions (20° C., 60% relative atmospheric humidity), during which the wrapping did not change noticeably.

The cable was then mounted over a wide natural gas burner such that the flame thereof enveloped the wrapping completely. After a burning time of 30 minutes, the cable was still fully functional. In the flame region, the wrapping had changed to a partly foamed, partly ceramised protective jacket, under which the cable jacket had changed pyrolytically only little.

A control experiment with the same burner arrangement but a corresponding non-wrapped polyvinyl chloride cable showed that the cable jacket was completely destroyed after 30 minutes and functioning of the cable was no longer guaranteed.

What is claimed is:

1. A laminated glass construction having as an intermediate layer a fireproofing gel based on an amine salt of an acid aluminum phosphate, which comprises an aluminum component, a phosphorus component, an amine component in proportions such that, at 5° to 30° C. for more than 24 hours, they form a mixture which is capable of flow and which changes into a transparent gel within less than 24 hours on heating at temperatures above 45° C. wherein said phosphorus component is present in an amount of 2 to 4 moles per mol of aluminum component.

* * * * *